Feb. 3, 1953 E. J. ST. LAURENCE 2,627,369
COIN-CONTROLLED BEVERAGE DISPENSING APPARATUS
Filed Oct. 15, 1949 6 Sheets-Sheet 1
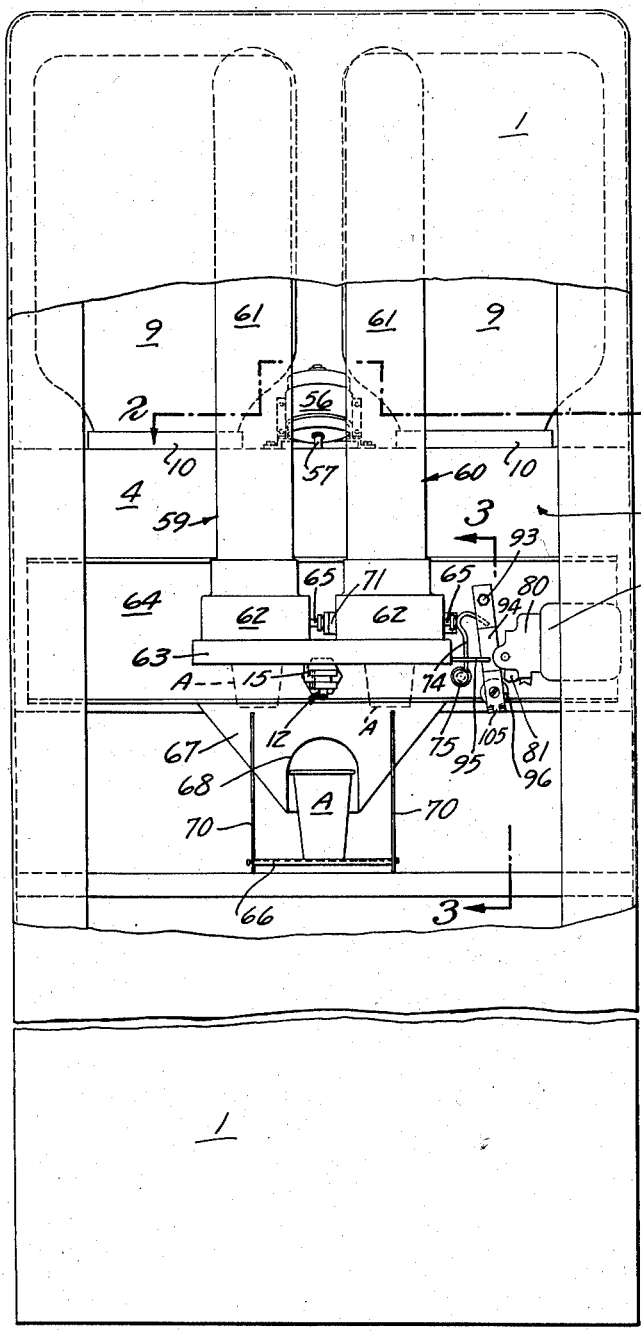
Inventor
Ernest J. St. Laurence
By his Attorneys
Merchant & Merchant

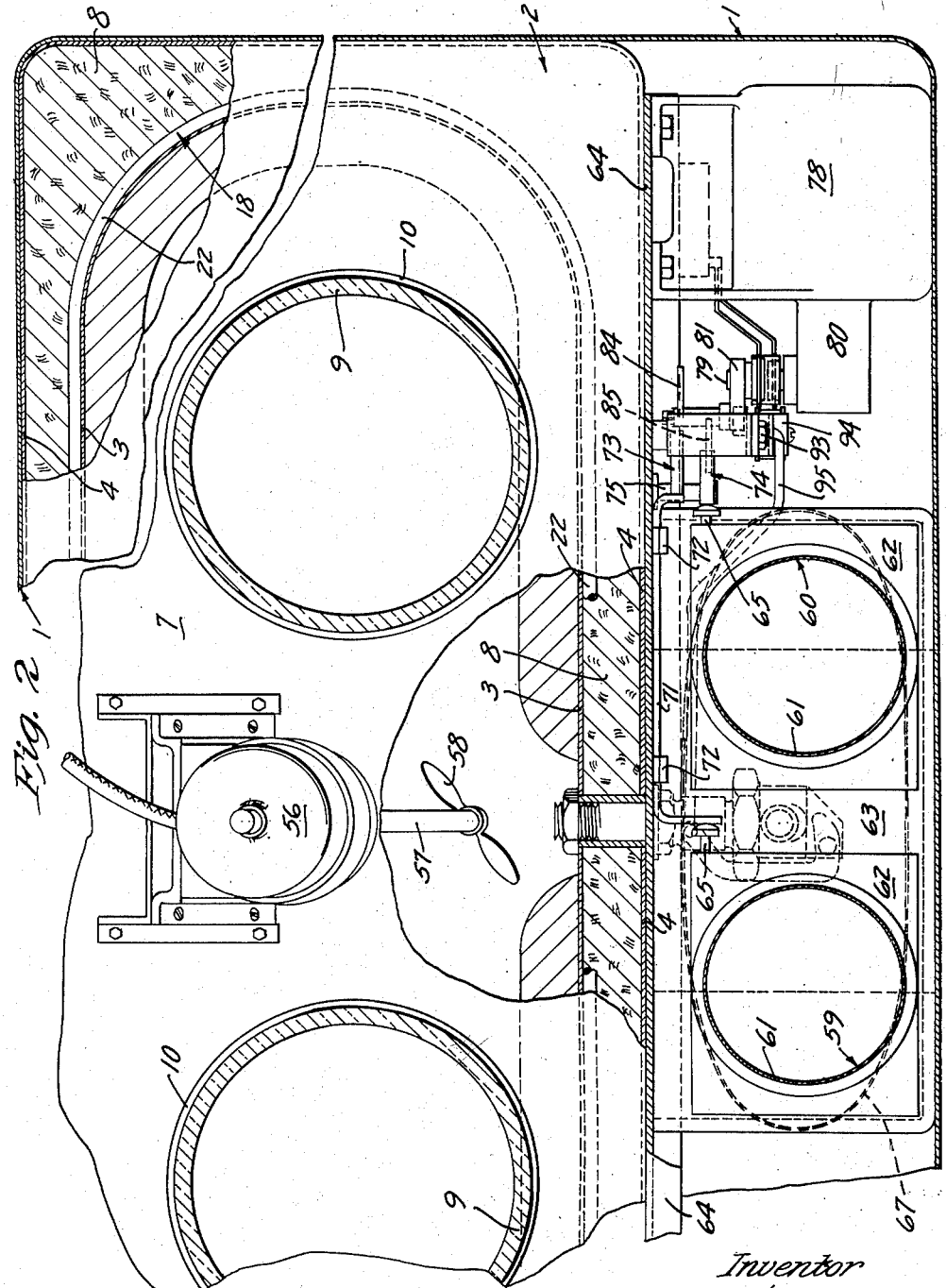

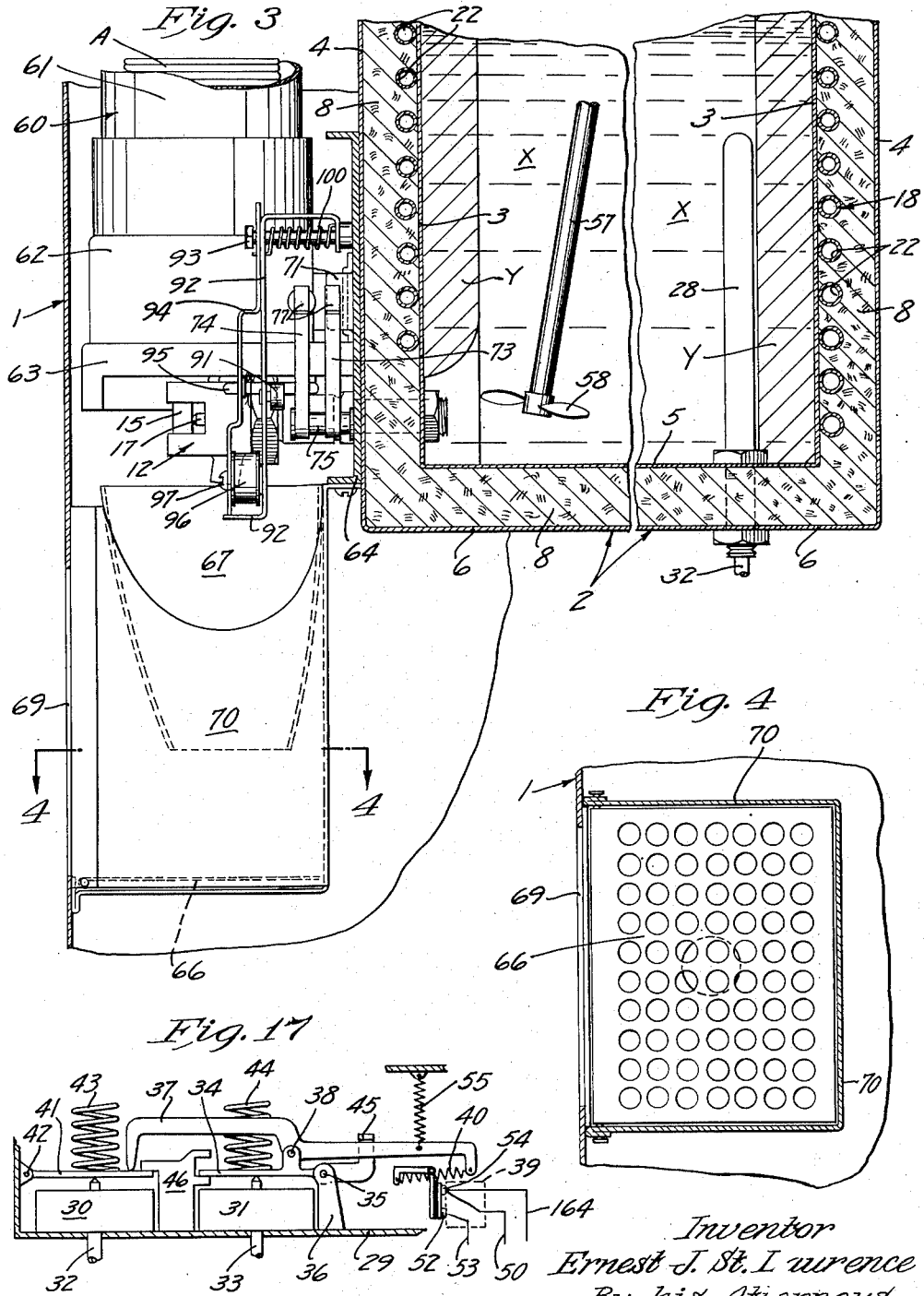

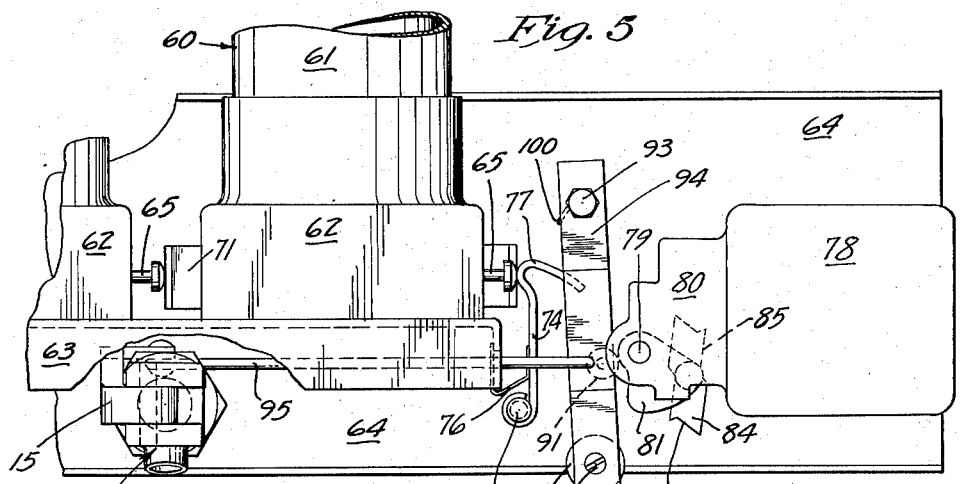

Feb. 3, 1953     E. J. ST. LAURENCE     2,627,369
COIN-CONTROLLED BEVERAGE DISPENSING APPARATUS
Filed Oct. 15, 1949     6 Sheets-Sheet 5
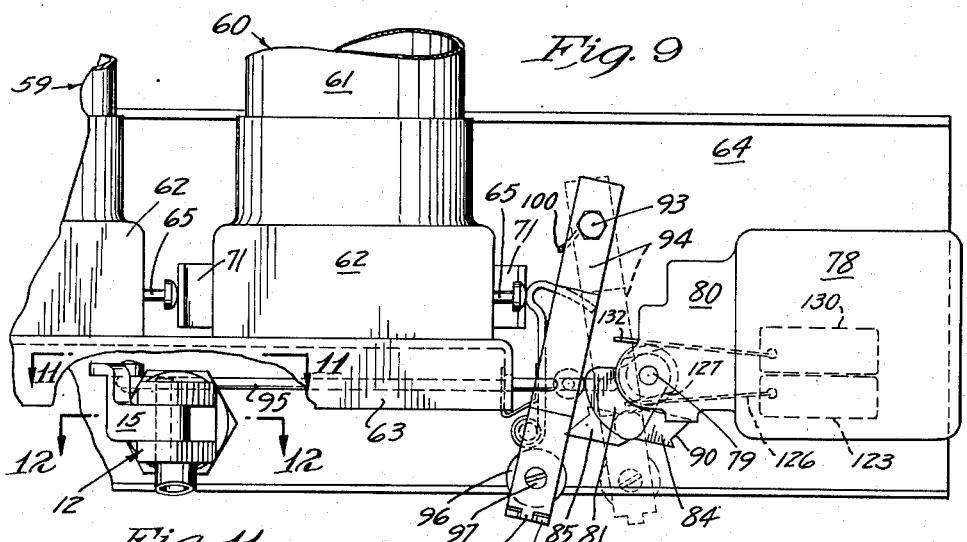
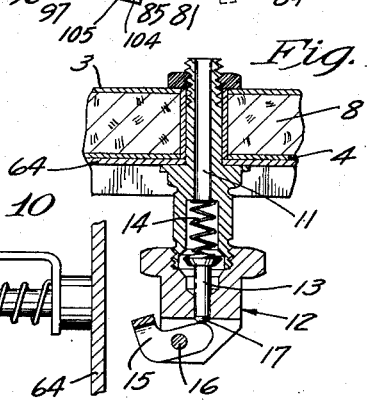
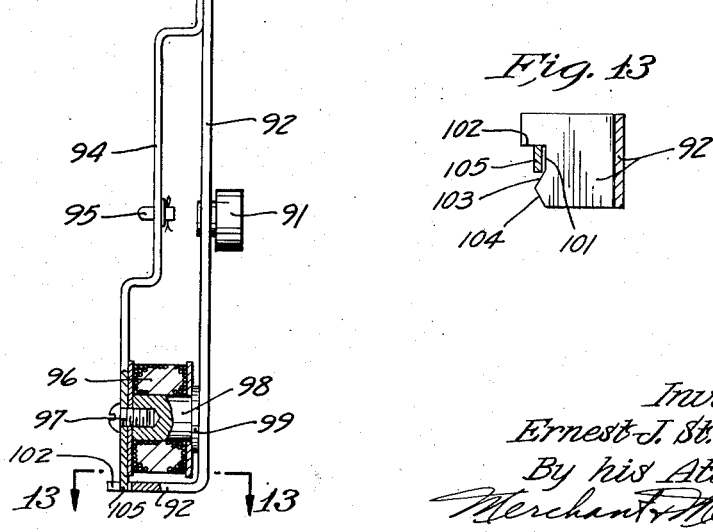
Inventor
Ernest J. St. Laurence
By his Attorneys
Merchant & Merchant

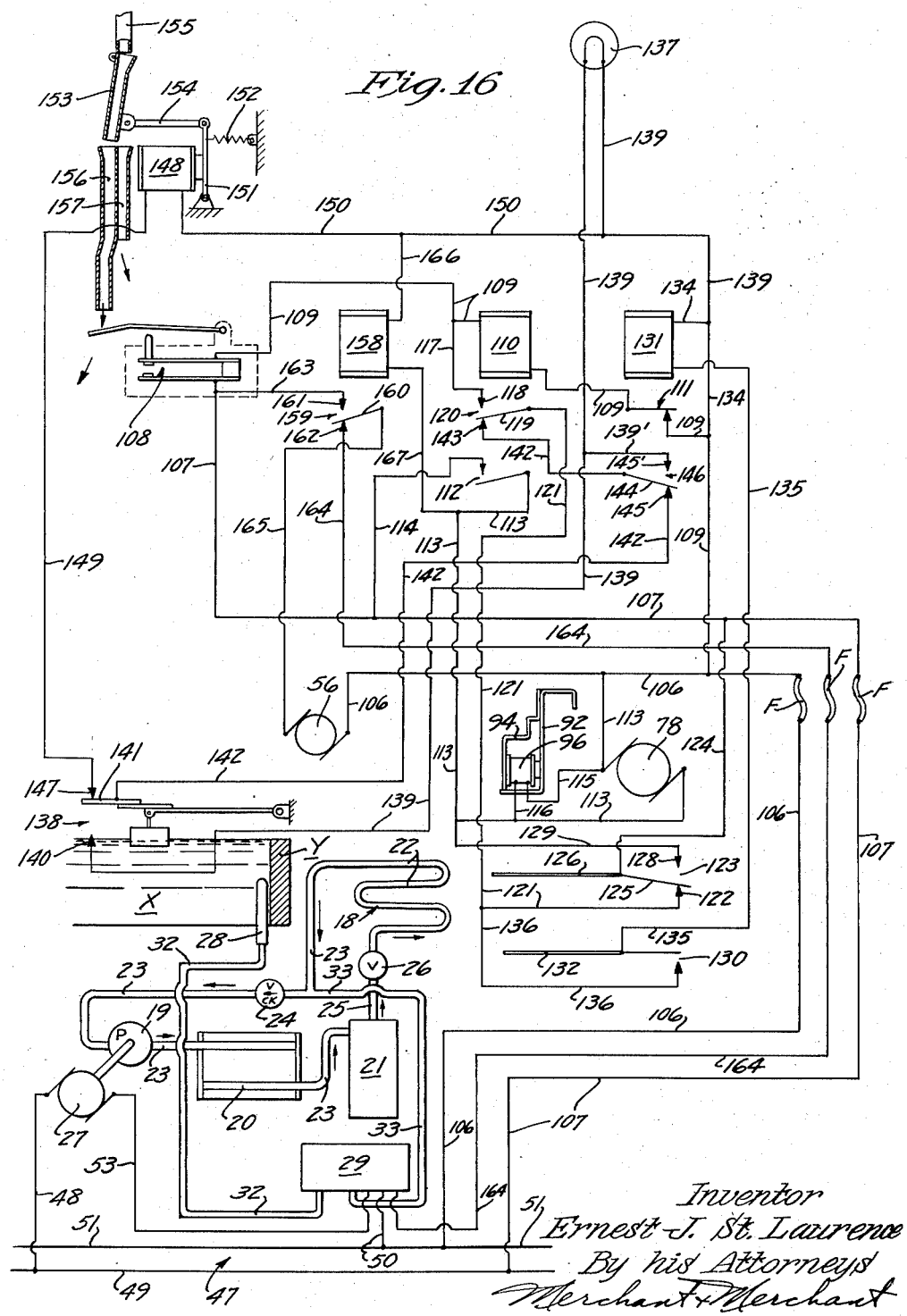

Patented Feb. 3, 1953

2,627,369

UNITED STATES PATENT OFFICE 2,627,369

COIN-CONTROLLED BEVERAGE DISPENSING APPARATUS

Ernest J. St. Laurence, Minneapolis, Minn.

Application October 15, 1949, Serial No. 121,571

4 Claims. (Cl. 225—21)

My invention relates generally to dispensing machines and, more specifically, to coin-controlled vending machines which dispense drink liquid in bulk to the user.

An important object of my invention is the provision of safety mechanism cooperating with the motor-driven liquid dispensing means for automatically shutting off the flow of liquid from the cooling tank upon interruption of operation of the motor, until another period of operation has been initiated.

A further important object of my invention is the provision of means for resetting said safety mechanism upon initiation of a new cycle of operation of the dispenser mechanism.

Other highly important objects and advantages of the instant invention will become apparent from the following detailed specification, appended claims and attached drawings.

Other important features of the machine illustrated herein form the subject matter of my copending application, Serial No. 296,965, filed by me on July 2, 1952, as a division of this application.

Referring to the drawings, in which like characters indicate like parts throughout the several views:

Fig. 1 is a view in front elevation of a drink dispenser built in accordance with my invention, some parts being broken away;

Fig. 2 is an enlarged fragmentary horizontal section taken substantially on the line 2—2 of Fig. 1, some parts being broken away;

Fig. 3 is a view partly in side elevation and partly in vertical section taken substantially on the line 3—3 of Fig. 1, on an enlarged scale;

Fig. 4 is a detail in horizontal section taken on the line 4—4 of Fig. 3;

Fig. 5 is a fragmentary view in front elevation of the cup and drink liquid dispensing mechanism of my device, on an enlarged scale, the parts thereof disposed in an inoperative position;

Fig. 6 is a detail in front elevation corresponding to a portion of Fig. 5, but showing an advance in movement of the cup-dispensing linkage;

Fig. 7 is a view corresponding to Fig. 6, but showing the cup-dispensing mechanism in an extreme advanced position, and a portion of the drink-dispensing linkage beginning an advance movement;

Fig. 8 is a view corresponding to Fig. 6, but showing the drink-dispensing linkage in a further advanced position;

Fig. 9 is a view corresponding to Fig. 5, but showing the drink liquid dispensing linkage moved to its extreme advanced position;

Fig. 10 is an enlarged fragmentary detail partly in side elevation and partly in section taken substantially on the line 10—10 of Fig. 7;

Fig. 11 is a fragmentary detail partly in horizontal section and partly in plan taken substantially on the line 11—11 of Fig. 9;

Fig. 12 is a detail in horizontal section taken substantially on the line 12—12 of Fig. 9;

Fig. 13 is a horizontal section taken substantially on the line 13—13 of Fig. 10;

Fig. 14 is a view in perspective of cam and pusher finger means embodied in the dispensing linkage of my improved machine;

Fig. 15 is a fragmentary section taken substantially on the line 15—15 of Fig. 14;

Fig. 16 is a wiring diagram of the electrical and refrigerating circuits of my dispenser; and Fig. 17 is a diagrammatic view of one of the controls of the refrigerating system of my invention.

Referring with greater particularly to the drawings, the numeral 1 indicates a dispenser housing containing at its intermediate portion a drink liquid or beverage cooling tank 2. The tank 2 is generally rectangular in form and comprises spaced inner and outer side wall elements 3 and 4, respectively, spaced inner and outer bottom wall elements 5 and 6, respectively, and a top wall 7. The top wall 7 may be assumed to have the same double wall construction as the side and bottom walls, the space between the inner and outer walls of the bottom, sides and top of the tnak being filled with suitable insulation 8, see particularly Figs. 2 and 3. The top wall 7 of the cooling tank 2 is provided with a pair of laterally spaced openings for the reception of the necks of a pair of storage flasks or the like 9 which are mounted in an inverted position on the tank 2. As shown, the necks of the flasks or bottles 9 rest upon rubber-like grommets 10 interposed therebetween and the openings in the top 7 of the tank 2. The flasks 9 contain identical drink liquids which may be in the nature of fruit juices, fruit "ades" and the like. The tank 2 is provided at its lower front side with an outlet 11 connecting the interior of the tank 2 with a dispensing valve 12. The valve 12 comprises a valve member 13 biased toward a valve closed position by a coil compression spring 14. A valve-operating lever 15 is pivoted intermediate its ends to the the valve 12, as indicated at 16, and has one of its ends engageable with the outer projected end 17 of the valve member 13 to unseat the same against the base of the spring 14.

I provide means for cooling the drink liquid in the tank 2 and maintaining the same at a substantially constant temperature, said means being in the nature of a mechanical refrigerating system comprising a refrigerant evaporator 18, a refrigerant pump 19, a refrigerant condenser 20 and a storage tank 21. The evaporator 18 consists of metallic tubing 22 coiled about the exterior of the inner side walls 3 of the tank 2. The tubes 22 of the evaporator 18 are connected to the pump 19 by a conduit 23 in which is interposed a check valve 24. The condenser 20 is interposed in the conduit 23 between the pump 19 and the storage tank 21. A conduit 25 extends from the storage tank 21 to the evaporator tubes 22 on the opposite side of the evaporator 18 from the conduit 23, and a conventional expansion valve 26 is interposed in the conduit 25 adjacent the evaporator 18. The pump 19 is driven by an electric motor 27. It will be noted that the refrigerating system thus far described is conventional in nature and it may be assumed that the pump 19, condenser 20, tank 21 and the valves 24 and 26 are contained in the bottom portion of the housing 1.

Means for controlling the refrigerating mechanism includes a thermostat element 28 extending upwardly through the bottom wall of the tank 2 in predetermined spaced relation to one of the inner side walls 3, and control apparatus contained within a housing 29 and shown diagrammatically in Fig. 17. The control apparatus comprises a pair of pressure-operated bellows 30 and 31, the former of which is connected to the thermostat element 28 by a tube 32. The bellows 30, tube 32 and thermostat element 28 are gas-filled, the bellows 30 being expanded or contracted by changes in pressure caused by expansion and contraction of gas within the thermostat element 28. The bellows 31 are connected to the conduit 23 between the evaporator 18 and the check valve 24 by a tube 33, and is responsive to changes in pressure in the evaporator 18 to expand and contract. The bellows 31 is adapted to work against a lever arm 34 which is pivoted at 35 to a bracket 36 in the housing 29. A lever 37 is pivoted intermediate its ends to the lever arm 34, as indicated at 38, and has one end connected to a toggle switch 39 by a coil tension spring 40. The opposite end of the lever 37 engages a lever arm 41 pivoted to a portion of the housing 29 as at 42, and engageable with the thermostat bellows 30. Coil compression springs 43 and 44, respectively, exert yielding bias on the lever arms 41 and 34 toward their respective bellows 30 and 31. The lever arm 34 extends laterally beyond the pivot 35 and is formed to provide a hook 45, which overlies and is adapted to engage the lever 37 between its pivot 38 and the end thereof coupled to the spring 40. A stop bracket 46 limits movements of the lever arms 41 and 34.

It will be seen by reference to Figs. 16 and 17 that the motor 27 is connected to a source of power, such as a power line 47 by a lead 48 extending from the motor 27 to a power lead 49. A lead 50 extends from the opposite power lead 51 to a terminal 52 on the switch 39, and a third lead 53 extends from the motor 27 to a second terminal 54 from the switch 39. The bellows 31 is responsive to an increase of pressure in the evaporator 18 to move the lever arm 34 against bias of the spring 44 and cause the hook 45 to engage the lever 37 and move the same in a direction to close the switch 39. Closing of the switch 39 will energize the motor 27 and initiate operation of the pump 19 whereby to evacuate the evaporator 18 and permit the refrigerant to be discharged thereinto through the expansion valve 26. The switch 39 is conventional in nature, the spring 40 thereof moving beyond dead center of the toggle-acting arm 39' in a direction to close the switch 39. When the liquid, indicated by the character X in the tank 2, is cooled to a predetermined degree, resultant cooling of the gas within the thermostat element 28 causes the bellows 30 to contract and allow the spring 43 to move the lever arm 41 in the direction of the bellows 30. Bias of a coil tension spring 55 moves the lever 37 at one end in the direction of the lever arm 41 and at its opposite end in the opposite direction whereby to move the spring 40 beyond dead center of the toggle arm 39' in a direction to open the switch 39 and terminate the pumping operation. From the above, it will be noted that operation of the compressor 19 is initiated only by a rise in pressure of the fluid refrigerant within the cooling coils 22 of the evaporator 18, and that operation thereof is terminated only by action of the thermostat element 28 and cooperating bellows 30. A drop in pressure in the coils 22 and the bellows 31 merely causes the hook portion 45 to move away from the lever 37 until the lever arm 34 engages the stop bracket 46, thus preventing said pressure drop from terminating operation of the compressor. On the other hand, engagement of the lever arm 41 with the stop bracket 46, due to a rise in temperature of the drink liquid and subsequent expansion of the bellows 30, prevents closing of the switch 39 and consequent operation of the compressor 19.

To maintain a substantially constant temperature of the drink liquid X in the cooling tank 2, I provide for the formation of a wall or bank of ice Y between the thermostat element 28 and the adjacent inner side wall 3. Operation of the refrigerating mechanism cools the drink liquid in the tank to a point where ice Y begins to form on the inner side walls 3 adjacent the cooling coils 22. This bank of ice thickens laterally inwardly from the side walls 3 until the temperature thereof causes the thermostat element 28 to terminate operation of the compressor 19. During the idle period of the compressor 19, heat from the exterior slowly seeps inwardly through the outer side walls 4 of the tank 2 and the insulation 8 therein to cause expansion and a resultant rise in pressure of the refrigerant fluid within the tubes 22 and the bellows 31. When this pressure reaches a predetermined degree, expansion of the bellows 31 against bias of the spring 44 will cause the switch 39 to be closed and a new refrigerating cycle to be initiated thereby.

I provide an agitator for keeping the drink liquid in circulation during the refrigerating cycle as well as during the dispensing operations of the machine. Said agitator comprises an electric motor 56 rigidly mounted on the top wall 7 of the cooling tank 2, an elongated motor shaft 57 extending angularly downwardly into the interior of the tank, and agitator blades 58 at the lower end of the shaft 57 adjacent the bottom of the tank 2. The agitator motor is adapted to be energized for operation simultaneously with the compressor 19 and during the drink-dispensing periods, by connections hereinafter to be described. Agitation of the liquid X helps to maintain an ice bank Y of uniform thickness throughout its area, and further serves to keep any small fruit particles in suspension in the drink liquid during the dispensing thereof.

A pair of like cup dispensers 59 and 60 are mounted in side by side relationship in the housing 1, and each comprises a tubular magazine 61 and a dispensing head 62. The dispensing heads 62 are mounted on a shelf-like support 63 which, at its rear end, is welded or otherwise rigidly secured to a plate-like bracket 64 mounted fast on the outer front wall section 4 of the cooling tank 2. The cup dispensers 59 and 60 are of the type commonly used in the dispensing of drinking cups and involve dispensing mechanisms, not shown, but contained within the dispensing heads 62. The dispensing mechanisms each include a reciprocatory member 65 yieldingly biased to a normal retracted position indicated in Figs. 1, 5, 6, and 8. The dispensing mechanisms are each responsive to dispense one cup for each advancing and retracting movement of its reciprocatory member 65. It will be seen, by reference to Figs. 1, 2, 5, and 9, that the dispensers 59 and 60 are located one adjacent either side of the drink-dispensing valve 12 and that the cups are adapted to be dispensed to a delivery station comprising a platform 66. The cups, indicated by A, are of the disposable waterproof paper variety and are guided in their movements from the dispensers 59 or 60 to the delivery platform 66 by funnel-like guiding means 67. The guiding means 67 is provided with an opening 68 in the front wall thereof which is aligned with a delivery opening 69 in the front wall of the dispenser housing 1. The guiding means 67 is supported by a rectangular frame 70 rigidly secured to the front wall of the housing 1 and to the lower edge portion of the bracket 64. A generally U-shaped extension bar 71 is mounted for lateral sliding movements on the bracket 64 by spaced guide members 72 and has one of its ends engageable with the reciprocatory member 65 of the cup dispenser 59. The opposite outturned end of the extension bar 71 lies adjacent to and in the plane of the outer surface of the reciprocatory member 65 of the dispenser 60, see particularly Figs. 1, 5, 6, 8 and 9, when both members 65 are in their normal retracted positions. A pair of rocker arms 73 and 74 are mounted for arcuate reciprocatory movements on a horizontally disposed pivot pin 75 extending laterally outwardly from the mounting bracket 64. Each of the rocker arms 73 and 74 is provided with a generally U-shaped stop member 76 welded or otherwise rigidly secured thereto. The free ends of the stop members 76 are adapted to engage an adjacent end portion of the cup dispenser supporting shelf 63 whereby to limit movements of the rocker arms 73 and 74 in one direction. As shown, the rocker arm 73 engages the outer end of the extension bar 71, whereas the rocker arm 74 has abutting engagement with the reciprocatory member 65 of the dispenser 60. Each of the rocker arms 73 and 74 are provided at their outer free ends with laterally projecting portions 77.

An electric motor 78 is mounted on the bracket 64 and drives a rotary shaft 79 at a relatively slow speed through a conventional gear train, not shown, but contained in a gear housing 80. Mounted fast on the shaft 79 for rotation therewith is a cam 80 provided adjacent a peripheral portion thereof with a shaft 82 extending in spaced parallel relation to the motor output shaft 79. A sleeve 83 is journaled for rotation on the shaft 82 and has projecting laterally outwardly therefrom a pair of integrally formed diametrically opposed planetary pusher fingers 84 and 85. The pusher fingers 84 and 85 lie in parallel planes spaced longitudinally with respect to the shafts 79 and 82. With reference particularly to Figs. 14 and 15, it will be seen that the shaft 82 is provided with an axially extending groove or channel 86 and a transverse aperture 87 adjacent its outer end. A resilient spring member 88 lies within the channel 86 and has a laterally projecting end portion 89 projecting outwardly through the aperture 87 in the shaft 82 to limit outward axial movements of the sleeve 83 thereon. The spring member 88 is formed to bear against the interior wall of the sleeve 83 whereby to retard or prevent free rotary movement of the sleeve 83 and fingers 84 and 85 about the axis of the shaft 82. By reference to Fig. 2, it will be seen that the planetary pusher finger 84 travels in a plane parallel to the plane of movement of the rocker arm 73 and that the projected end 77 of the rocker arm 73 normally lies in the field of movement of said pusher finger 84. The rocker arm 74 and pusher finger 85 have a similar relationship, the projected end 77 of the pusher finger 74 lying in the field of planetary movement of the pusher finger 85. The radially outer ends of the pusher fingers 84 and 85 are notched, as indicated at 90, the projected ends 77 of the rocker arms 73 and 74 being respectively receivable therein.

Referring particularly to Figs. 5 to 8, inclusive, it will be seen that rotation of the motor shaft 79 in a counterclockwise direction causes the projected end 77 of the rocker arm 74 to be engaged in the notch 90 of the pusher finger 85. As indicated in Fig. 7, further rotary movement of the shaft 79 causes the pusher finger 85 to move the rocker arm 74 and reciprocatory member 65 of the dispenser 60 in a direction from the left to the right, whereby to dispense a single cup A to the delivery platform 66. Engagement of the projected end 77 of the rocker arm 74 in the notch 90 of the pusher finger 85 causes a rotary movement in a clockwise direction of the sleeve 83 about the axis of the shaft 82, whereby to permit the pusher finger 85 to be disengaged from the projected end 77 of the rocker arm 74. Release of the projected end 77 from the notch 90 permits the spring-biased reciprocatory member 65 of the dispenser 60 to move the rocker arm 74 back to its normal position of Fig. 5, where it is maintained by engagement of the U-shaped member 76 thereof with the supporting shelf 63. With reference to Fig. 8, it will be seen that further rotary movement of the cam 81 moves the pusher finger 85 into engagement of its extreme outer end with the intermediate portion of the rocker arm 74. This engagement causes the pusher fingers and the sleeve 83 to move further in a clockwise direction with respect to Figs. 5 to 8, inclusive. The total amount of clockwise movement imparted to the pusher finger 85 by the projected end 77 and the intermediate portion of the rocker arm 74 is equal to 180 degrees or a one-half revolution of the sleeve 83 about the shaft 82. Thus, as the cam 81 rotates about the axis of the shaft 79, the pusher finger 84 is brought into operative engagement with the projected end 77 of the rocker arm 73 whereby to produce a cycle of reciprocating movement to the element 65 of the cup dispenser 59 and discharge a cup therefrom. The rocker arm 73 and pusher finger 84 cooperate in the same manner as the pusher finger 85 and rocker arm 74, above described, to rotate the sleeve 83 upon the shaft 82 whereby to again position the pusher finger 85 for engagement with the projected end 77 of the rocker arm 74. It should be noted that a single cup-dispensing operation involves a single complete rotation of the motor shaft 79 and that the motor 78 is deenergized between periods of operation by control apparatus hereinafter to be described.

The cam 81 engages a cam follower in the nature of a roller 91 journaled to the intermediate portion of a rocker arm 92 which has its upper end formed in an inverted U shape and journalled on a stud or bolt 93 projecting laterally outwardly from the mounting bracket 64. A second rocker arm 94 is loosely pivotally mounted at its upper end to the stud 93 and is normally disposed in side by side relation with the rocker arm 92. A rigid link 95 connects the intermediate portion of the rocker arm 94 with the free end of the valve-operating lever 15. It will be seen particularly by reference to Fig. 10 that the lower end portion of the rocker arm 94 is laterally offset from the upper journalled end portion thereof and is provided with an electromagnet 96 secured thereto by a machine screw or the like 97. The core or pole piece 98 of the magnet 96 is provided with a head 99 which becomes magnetically attached to the lower end portion of the rocker arm 92 when the magnet 96 is energized, whereby common arcuate reciprocating movements are imparted to the rocker arms 92 and 94 upon rotation of the cam 81. A torsion spring 100 biases the reciprocatory arms 92 and 94 in the direction of the cam 81 and maintains contact between said cam 81 and the roller 91. It should also be noted that the valve spring 14 exerts yielding bias upon the rocker arm 94 through the valve lever 15 and the rigid link 94 in a direction to close the valve 12 independently of the torsion spring 100. The extreme lower end portion of the rocker arm 92 is formed to project laterally outwardly in the direction of the rocker arm 94 and terminates in a laterally outwardly opening notch 101 formed by an abutment 102 at one side thereof, and a cam surface 103 at the other side thereof. The cam surface 103 cooperates with a second cam surface 104 to provide a latch detent for cooperation with a latch dog element 105 which is shown as being a reduced longitudinally extended lower end portion of the rocker arm 94. It should be noted that when the electromagnet or latch actuator 96 is energized, the latch dog element 105 will be effectively locked in the notch 101 for common reciprocatory movement of the arms 92 and 94. However, if the electromagnet is deenergized, the latch dog element 105 will move easily over the cam surfaces 103 and 104 so that the rocker arm 94 operates independently of the rocker arm 92. In other words, during rotation of the cam 81, failure to energize the magnetic latch actuator 96 will result in arcuate reciprocatory movement only of the rocker arm 92, bias of the valve spring 14 being sufficient to cause the latch dog element 105 to be cammed out of the notch 101, resulting in failure of the valve 12 to open. The electromagnetic latch actuator 96 and the cooperating latch elements 101 and 105 provide a safety mechanism for the valve 12 during dispensing of the drink liquid from the tank 2, to wit: failure of electric power supply to the machine for any reason will cause the electromagnet 96 to be deenergized and permit the valve spring 14 to close the valve 12, thus preventing a continuous discharge of the drink liquid from the tank.

A single drink-dispensing operation requires one complete revolution of the shaft 79 in the same manner as the cup-dispensing operation above described. The timing of the drink-dispensing operation with respect to the cup-dispensing operation is determined by the shape of the cam 81 and the location of the planetary pusher fingers 84 and 85 with respect thereto. By reference to Fig. 7, it will be seen that one of the cup dispensers is caused to dispense the cup before any appreciable reciprocating movement is imparted to the rocker arms 92 and 94. Rotary movement of the cam 81 is sufficiently slow to permit the dispensed cup A to reach the receiving platform 66 before drink liquid is discharged from the valve 12. The amount of drink liquid dispensed is determined by the shape of the cam 81 and the rotary speed thereof, as well as by the size of the discharge opening of the valve 12. The electromagnetic latch actuator 96 acts as a safety device to prevent unscrupulous persons from cheating the dispensing machine by cutting off the electrical power to the machine while the valve 12 is open, whereby to stop the motor 78 and cause the valve 12 to remain open. As above indicated, when the cam 81 and parts moved thereby are in the valve open position of Fig. 9, shutting off of the power either accidentally or intentionally will deenergize the electromagnetic latch actuator 96 and permit the latch dog element 105 to be released from the notch 101 and the valve spring 14 will close the valve 12 and cause the arm 94 to swing out of alignment with the rocker arm 92, as shown by dotted lines in Fig. 9. Then, when the machine is again supplied with electric power, the drink-dispensing period will be completed with the valve 12 closed until the next cup and drink-dispensing cycle is initiated.

The agitator motor 56, in addition to being energized during the operation of the compressor 19, is adapted to be energized during the cup and drink-dispensing periods, together with operation of the motor 78 and the electromagnetic latch actuator 96. Operation of these elements during the dispensing periods is controlled by a number of relays and switches now to be described. A pair of leads 106 and 107 extend, the former from the power line 51 to the agitator motor 56 and the latter from the power line 49 to one side of a coin-operated momentary contact switch 108. The circuit is completed through the switch 108 by a lead 109 extending from the opposite side thereof to a lead 106 and from thence to the power line 51. Interposed in the lead 109 is a dispensing relay 110 and a normally closed relay-operated switch 111. Energization of the dispensing relay 110 closes a normally open dispensing relay-operated switch 112 to complete a circuit through the motor 78, said circuit including a lead 113 extending from the power lead 106 to the motor 78 and from thence to the switch 112. Another lead 114 extends from the switch 112 to the power lead 107 to complete the circuit. It will be noted that the electromagnetic clutch actuator 96 is connected in parallel with the motor 78 in the lead 113 by leads 115 and 116 so that the actuator 96 is energized simultaneously with the motor 78. A holding circuit for the dispensing relay comprises a portion of lead 109 extending from the power lead 106 and a lead 117, the switch contacts 118 and 119 of a dispensing relay-operated double-throw switch 120, a lead 121 extending from the movable contact 119 to a fixed contact 122 of a double-throw switch 123 operated by the motor 78. A lead 124 extending from a movable contact 125 of the switch 123 completes the holding circuit to the power lead 107.

With reference to Figs. 2, 9, and 14, it will be seen that the switch 123 is provided with an arm 126 that is adapted to engage a cam element 127 rigidly mounted on the cam element 81 for common rotation therewith. During the rotation of the cams 81 and 127, the switch arm 125 is moved from the stationary switch contact 122 to an opposite stationary contact 128 in the switch 123 with a snap action, whereby to provide a holding circuit for the motor 78 and the latch actuator 96 independently of the relay-operated switch 120 so that when the contact is broken between the switch contacts 122 and 125 whereby to deenergize the dispensing relay 110, operation of the motor 78 and relay 96 will be uninterrupted. This motor and actuator holding circuit comprises the portion of the lead 113 connected to the power lead 106, a lead 129, switch contacts 128 and 125 and lead 124 extending to the power lead 107. The cycle of operation is completed when the cam 127 moves the arm 126 to open the switch contacts 125 and 128 and recloses the contacts 125 and 122.

To prevent repeated uninterrupted recycling of the cup and drink-dispensing mechanism in the event that the connection between the switch contacts 125 and 122 of the switch 123 should fail to break, I provide a switch 130 controlling a relay 131. The switch 130 is provided with a switch arm 132 which is operated by a cam 133 rigidly mounted on the cam element 81 for common rotation therewith. The switch 130 and relay 131 are interposed in a circuit including a portion of lead 109, a short lead 134, a lead 135 connecting the relay coil 131 with the switch 130, a lead 136 extending from the switch 130 and a portion of lead 121, switch contacts 122 and 125, and lead 124. The cam portion 133 and switch arm 132 are so disposed that the switch 130 will be normally closed after the switch contacts 122 and 125 have been opened, so that the circuit through the relay 131 is not normally completed. However, in the event of sticking of the contacts 122 and 125, the relay 131 will be energized by the closing of switch 130 whereby to open the normally closed switch 111 and break the circuit of the dispensing relay 110 to terminate the dispensing operation and render the machine inoperative until switch 123 has been repaired or replaced.

Visual means for indicating that the tank 20 is empty of drink liquid X comprises a warning light 137 mounted so as to be clearly visible to the operator and controlled by a float-operated switch 138. The lamp 137 is interposed in a lead 139 which extends from the lead 134 to a fixed switch contact 140 of the switch 138. A movable contact 141 of the switch 138 is connected to one end of a lead 142 which terminates in a fixed contact 143 of the dispensing relay-operated switch 120. Interposed in the lead 142 are movable and stationary normally closed switch contacts 144 and 145, respectively, of a double-throw switch 146 operated by the relay 131. The circuit for the lamp 137 is completed through the switch contacts 143 and 119, lead 121, switch contacts 122 and 125, and lead 124 to the power lead 107. The lamp 137 will be caused to light whenever the relay 131 is energized, so as to provide a warning that the machine is inoperative. To this end, I provide a lead 139' connecting the lead 139 with a fixed contact 145' of the double-throw switch 146. A circuit is completed from the power lead 107 through the lead 124, switch contacts 125 and 122, lead 121, switch contacts 119 and 143, lead 142, switch contacts 144 and 145', leads 139' and 139, the interposed lamp 137 and portions of leads 134 and 109 to the power lead 106.

The float-operated switch 138 is provided with a fixed contact 147 which engages the movable contact 141 as long as sufficient drink liquid X remains in the tank 2, and is connected to a solenoid 148 by a lead 149. Another lead 150 extends from the solenoid 148 to the lead 139 between the lamp 137 and the connection thereof to the leads 134 and 109. It will be seen that the solenoid 148 is energized during the time that the switch contacts 122 and 125 of the switch 123 are closed, the circuit being completed from the power lead 106 through portions of leads 109, 134 and 139, lead 150, the solenoid 148, lead 149, switch contacts 147 and 141, lead 142, switch contacts 143 and 119, lead 121, switch contacts 122 and 125, and lead 124 to the power lead 107. From the above, it will be seen that the solenoid 148 is energized during the idle period of the machine until the circuit therefor is broken by energization of the dispensing relay 110. The solenoid 148 operates a rocker arm 151 against bias of a spring 152 to move a movable coin chute portion 153 by means of a link 154. The movable coin chute portion 153 receives coins from a coin chute 155 and, during energization of the solenoid 148, delivers said coins to a coin chute 156 which guides the coins to the coin-operated switch 108, whereby to close the same and initiate a cup and drink-dispensing period of the machine. Closing of the switch 108 energizes the dispensing relay 110 which results in breaking of the connection between the switch contacts 119 and 143 of the relay-operated switch 120 to break the circuit to the solenoid 148. The bias of the spring 152 moves the coin chute portion 153 toward alignment with a coin return chute 157, whereby additional coins mistakenly inserted in the coin chute 155 will be returned to the operator. It should be noted that coins inserted in the coin chute 155 during the time that the tank 2 is empty of the drink liquid X will be returned through the coin chute because of the deenergized condition of the solenoid 148 due to the broken connection between switch 141 and 147 of the float-operated switch 138.

The agitator motor 56 is controlled during the dispensing periods of the machine by a relay 158 through a double-throw relay switch 159. The switch 159 comprises a contact 160 movable between fixed contacts 161 and 162, the former of which is connected by a lead 163 to the power lead 107 and the latter of which is connected to the refrigerating control switch 39 by a lead 164. The switch arm 160 is connected to the agitator motor 56 by a lead 165. The relay 158 is in a circuit comprising a portion of lead 109 extending from the power lead 106, connected portions of leads 134, 139 and 150, a lead 166 extending from the lead 150 to the relay 158, a lead 167 extending from the relay 158 to the lead 113, a portion of lead 113, switch 112 and lead 114 to the power lead 107. During the idle period of the machine, the agitator 56 is interposed in a circuit comprising the lead 165, closed contacts 160 and 162 of the switch 159, lead 164, and the switch 39 whereby to be operated only during the operation of the compressor 19 and motor 27 therefor. However, during the dispensing operation of the machine, the agitator motor 56 is disconnected from the circuit of the switch 39 by breaking of the connection between contacts 160 and 162 of the switch 159. Energization of the relay 158 by closing of the switch 112 causes the contacts 160 and 161 to be connected, thereby closing the circuit from the power lead 106 through the agitator motor 56, the lead 165 and the lead 163 to the power lead 107. Deenergization of the relay 110 as hereinbefore described will allow the switch 112 to open to deenergize the relay 158 with a resultant deenergization of the agitator motor 56, unless the circuit to the motor 56 through the lead 164 and switch 39 has been completed in the meantime. It will be noted that the power leads 106 and 107 as well as the agitator motor lead 164 are provided with fuses, as indicated at F.

A cycle of dispensing operation is summarized as follows: A coin inserted through the coin chute 155 closes the coin switch 108 to energize the dispenser relay 110. When thus energized, the relay 110 closes parallel circuits through the dispenser motor 78 and the electromagnetic latch actuator 96. Operation of the motor 78 rotates the cam 81 and moves one of the planetary pusher fingers 84 or 85 into engagement with its respective rocker arm 73 and 74, whereby to operate one of the cup-dispensers to deliver a cup A to the delivery platform 66. Simultaneous with the energization of the actuator 96 and the motor 78, the agitator relay 158 is energized to operate the agitator motor control switch 159 to start the agitator motor 56. Continued rotation of the cam element 81 moves the reciprocatory members 92 and 94 and the rigid link 95 in a direction to open the valve 12 for the dispensation of the drink liquid X into the cup A. As the cam element 81 continues to rotate, the switch 123 is moved to close the holding circuit for the motor 78 and latch actuator 96 and the reciprocatory members 92 and 94 and link 95 move in a reverse direction to close the valve 12. Upon completion of a single rotation of the cam element 81 about its axis, the valve 12 will be closed and the opposite pusher finger 84 or 85 will be moved to a position about its own axis whereby it will engage the other of the rocker arms 73 or 74. At this time, the switch 123 is moved by the cam portion 127 to connect the contact 125 and 122 whereby the circuit is in condition for another period of operation upon reclosing of the coin-operated switch 108.

My invention has been thoroughly tested and found to be adequate for the accomplishment of the objectives set forth, and while I have disclosed a commercial embodiment of my improved dispensing device, it will be understood that the same is capable of various modifications without departure from the spirit and scope of the invention as defined in the claims.

What I claim is:

1. In a drink-vending machine, a supply reservoir, a normally-closed valve controlling discharge of liquid from said reservoir, valve-operating mechanism comprising an electric motor, valve-operating linkage interposed between the motor and valve for opening and closing the valve once for each operating period of the motor, said operating linkage comprising first and second reciprocatory members, operating connections between the first reciprocatory member and the motor imparting a definite cycle of advance and return movement through a field of predetermined length for each cycle of operation of the motor, operating connections between the second reciprocatory member and valve, yielding means biasing the second reciprocatory member and valve to move in a valve-closed direction, an electromagnetically-closed self-releasing latch normally locking said reciprocatory members together for substantially common movements, means including a primary control switch for simultaneously energizing the valve-operating motor and the electromagnetically closed latch to initiate drink-dispensing periods, and switch means under control of said valve-operating motor for simultaneously deenergizing the motor and electromagnetically-closed latch to terminate drink-dispensing periods, whereby in the event of deenergization of the valve-operating motor during a drink-dispensing period, the said latch means will be released allowing the second reciprocatory member and valve to move to closed positions under the influence of said yielding means and independently of the motor and first reciprocatory member.

2. In a drink-vending machine, a supply reservoir, a normally closed valve controlling discharge of liquid from said reservoir, valve-operating mechanism comprising an electric motor, valve-operating linkage interposed between the motor and valve for opening and closing the valve once for each operating period of the motor, said operating linkage comprising first and second reciprocatory members, operating connections between the first reciprocatory member and the motor imparting a definite cycle of advance and return movement through a field of predetermined length for each cycle of operation of the motor, operating connections between the second reciprocatory member and valve, yielding means biasing the second reciprocatory member and valve to move in a valve-closed direction, a latch normally locking said reciprocatory members together for substantially common movements, said latch comprising separable latch elements yieldingly biased toward a latch-released position, an electromagnetic latch actuator for setting said latch, means including a primary control switch for simultaneously energizing the valve-operating motor and the latch actuator to initiate drink-dispensing periods, and switch means controlled by said valve-operating motor for simultaneously deenergizing a motor and latch actuator to terminate drink-dispensing periods, whereby in the event of deenergization of the valve-operating motor during a drink-dispensing period, said latch means will be released allowing the second reciprocatory member and valve to move to closed positions under the influence of said yielding means and independently of the motor and first reciprocatory member.

3. The structure defined in claim 2 in which said primary control switch is coin-operated.

4. In a drink-vending machine, a supply reservoir, a normally closed valve controlling discharge of liquid from said reservoir, valve-operating mechanism comprising an electric motor, valve-operating linkage intermediate the motor and valve for opening and closing the valve once for each period of operation of the motor, said operating linkage comprising a motor-driven member and a valve-operating member, said members being pivotally mounted on a common axis for arcuate reciprocatory movements in parallel planes, yielding means biasing the valve-operating member in a valve-closing direction, and an electromagnetically closed self-releasing latch normally locking said reciprocatory members together for substantially common reciprocatory movements, means including a switch for energizing the motor and electromagnetic latch to initiate drink-dispensing periods, and motor-controlled switch means for deenergizing the motor and electromagnetic latch to terminate the drink-dispensing periods.

ERNEST J. ST. LAURENCE.

REFERENCES CITED

The following references are of record in the file of this patent:

UNITED STATES PATENTS

| Number | Name | Date |
|---|---|---|
| 2,237,411 | Carlson | June 18, 1938 |
| 2,278,226 | Taylor | Mar. 31, 1942 |
| 2,353,080 | Richmond | July 4, 1944 |
| 2,359,791 | Ralston | Oct. 10, 1944 |
| 2,370,276 | Warren | Feb. 27, 1945 |
| 2,376,403 | Thompson et al. | May 22, 1945 |
| 2,426,707 | Polsen et al. | Sept. 2, 1947 |